United States Patent
Herzer

(10) Patent No.: US 8,699,190 B2
(45) Date of Patent: Apr. 15, 2014

(54) SOFT MAGNETIC METAL STRIP FOR ELECTROMECHANICAL COMPONENTS

(75) Inventor: Giselher Herzer, Bruchköbel (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 31 days.

(21) Appl. No.: 13/301,552

(22) Filed: Nov. 21, 2011

(65) Prior Publication Data

US 2012/0127620 A1 May 24, 2012

Related U.S. Application Data

(60) Provisional application No. 61/416,502, filed on Nov. 23, 2010.

(51) Int. Cl.
*H01H 73/00* (2006.01)

(52) U.S. Cl.
USPC .................................. 361/42; 361/115

(58) Field of Classification Search
USPC .................. 361/42, 115; 164/423, 463
See application file for complete search history.

(56) References Cited

U.S. PATENT DOCUMENTS

| | | | |
|---|---|---|---|
| 4,353,103 A | 10/1982 | Whitlow | |
| 4,366,520 A | 12/1982 | Finke et al. | |
| 4,626,781 A * | 12/1986 | Forkel | 324/174 |
| 5,110,378 A | 5/1992 | Hasegawa et al. | |
| 5,911,840 A | 6/1999 | Couderchon et al. | |
| 5,922,143 A | 7/1999 | Verin et al. | |
| 5,935,346 A | 8/1999 | Couderchon et al. | |
| 6,299,989 B1 | 10/2001 | De Cristofaro et al. | |
| 6,425,960 B1 * | 7/2002 | Yoshizawa et al. | 148/300 |
| 6,648,994 B2 * | 11/2003 | Sunakawa et al. | 148/561 |

FOREIGN PATENT DOCUMENTS

| | | |
|---|---|---|
| CN | 101477868 | * 7/2009 |
| DE | 3037002 | 2/1989 |
| DE | 10045705 | 4/2002 |
| DE | 69708828 | 6/2002 |
| DE | 69715575 | 5/2003 |
| DE | 69814983 | 5/2004 |
| DE | 69823621 | 5/2005 |
| DE | 102004024337 | 12/2005 |
| DE | 69834615 | 4/2007 |
| DE | 102006019613 | 11/2007 |
| EP | 0271657 | 6/1988 |
| EP | 0392204 | 10/1990 |
| EP | 0563606 | 10/1993 |
| EP | 0844628 | 5/1998 |
| EP | 0848397 | 6/1998 |
| EP | 0883141 | 12/1998 |
| EP | 0921540 | 6/1999 |
| EP | 0921541 | 6/1999 |
| EP | 1710812 | 10/2006 |
| EP | 1925686 | 5/2008 |
| EP | 2015321 | 1/2009 |
| GB | 1359714 | 7/1971 |

OTHER PUBLICATIONS

EPO Search Report for PCT/IB2011/055166 dated Mar. 6, 2012.

* cited by examiner

*Primary Examiner* — Danny Nguyen
(74) *Attorney, Agent, or Firm* — Dickinson Wright PLLC

(57) ABSTRACT

The invention relates to a soft-magnetic metal strip for electromechanical components, wherein the soft-magnetic metal strip has a nanocrystalline or amorphous structure. The metal strip has strip thickness to roughness ratios d/Ra of $5 \leq d/Ra \leq 25$.

19 Claims, 16 Drawing Sheets

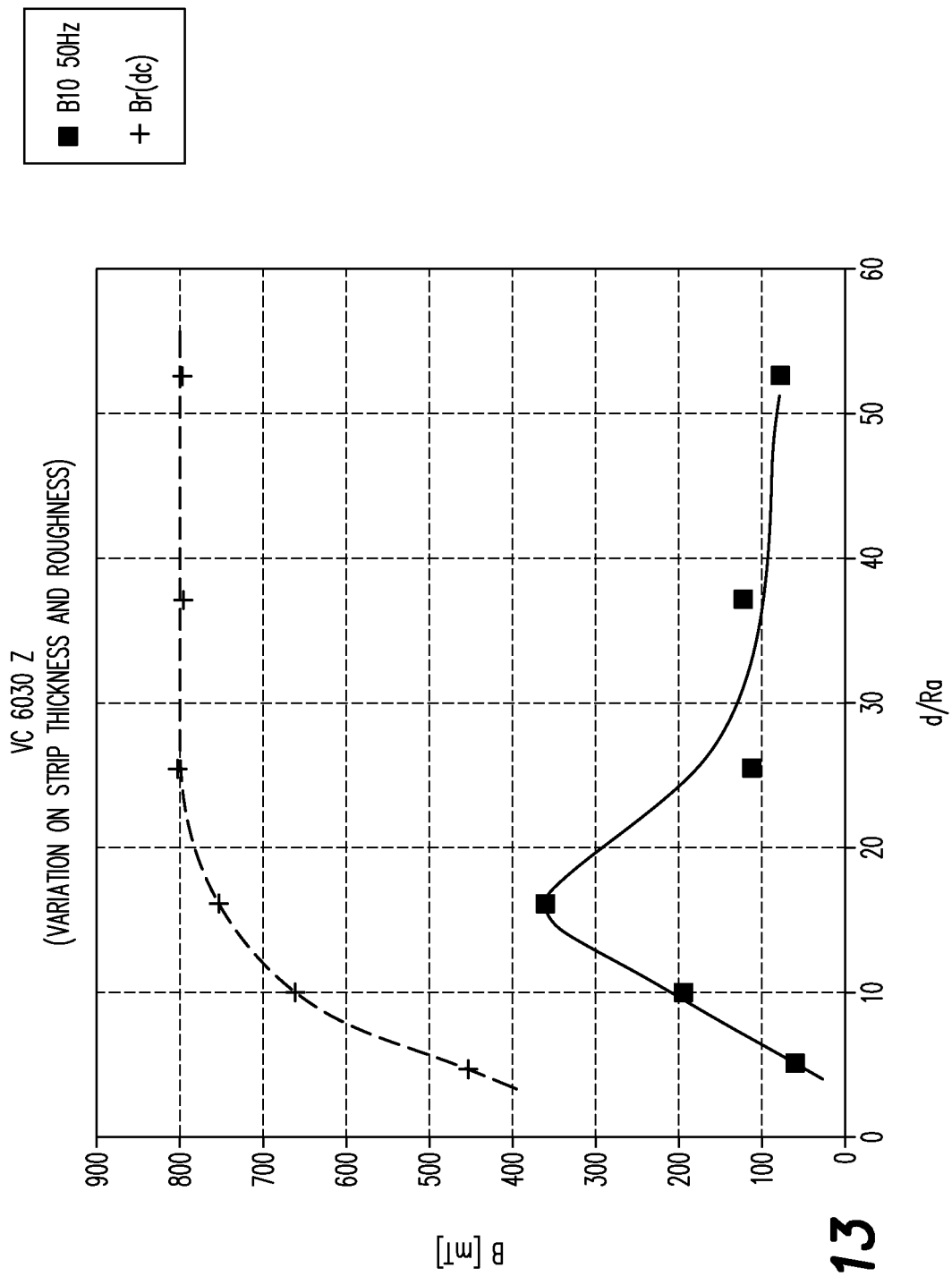

SOFT MAGNETIC METAL STRIP FOR ELECTROMECHANICAL COMPONENTS

This application claims priority to U.S. Provisional Application Ser. No. 61/416,502, filed Nov. 23, 2010, the entire contents of which is incorporated herein by reference.

BACKGROUND

1. Field

Disclosed herein is a soft-magnetic metal strip for electromechanical components, in particular AC ground fault current interrupters.

2. Description of Related Art

A method for the production of a magnet core for AC ground fault current interrupters from soft-magnetic alloys is described in U.S. Pat. No. 5,922,143. An amorphous strip of an iron-based alloy is produced using a rapid solidification technology, is wound to form a magnet core and finally heat-treated to generate a nanocrystalline structure.

This magnet core is less affected by mechanical stresses, so that the desired permeability value is obtained more reliably. There is, however, a need for further improvements.

U.S. Pat. No. 4,353,103 describes certain embodiments of a ground fault current interrupter circuit.

U.S. Pat. No. 6,299,989 describes certain embodiments of an amorphous metal ribbon and transformer cores made therefrom.

SUMMARY

The present disclosure is based on the problem of creating a soft-magnetic metal strip for electromechanical components which is in particular suitable for applications at 50 Hz, such as in AC ground fault current interrupters, and which can be produced repeatably.

In one embodiment of the application, a soft-magnetic metal strip for electromechanical components is created. The soft-magnetic metal strip has a nanocrystalline or amorphous structure and strip thickness to roughness ratios d/Ra of $5 \leq d/Ra \leq 25$, wherein Ra is the average roughness value.

As used herein, the term "average roughness" means the average value of the roughness measured for the lower surface of the metal strip. The lower surface of the metal strip is defined as the surface which is in contact with the caster roller when the metal strip solidifies on the caster roller during production by rapid solidification.

The magnetisation properties of this soft-magnetic metal strip are determined by a strip thickness d and a roughness Ra. A strip thickness to roughness ratio d/Ra of $5 \leq d/Ra \leq 25$ results in an improvement of permeability in AC applications and the reliable provision of this improved permeability.

This soft-magnetic metal strip offers the advantage that electromechanical components with short response times, such as ground fault current interrupters or speed sensors, can be implemented with a toroidal strip-wound core which, while having a low coercive field strength of a few tens of milliamperes per centimeter, can trigger a switching action or signal the passage of a permanent magnet in order to allow speed measurements instead of Hall generators.

The soft-magnetic metal strip has a nanocrystalline or amorphous structure. The soft-magnetic metal strip is characterized by a nearly rectangular hysteresis loop and low eddy-current losses; both of these qualities can be utilized in fast-responding electromechanical components such as ground fault current interrupters, which are used at 50 Hz.

In one embodiment, the soft-magnetic metal strip has a maximum of magnetic induction values at strip thickness to roughness ratios d/Ra of $10 \leq d/Ra \leq 20$.

In particular embodiments, the strip thickness may be 5 µm<d<30 µm, or 5 µm<d<20 µm. In particular embodiments, roughness Ra may be 0.6 µm<Ra<2.5 µm, or 1 µm<Ra<2 µm.

At an average roughness of approximately 1 µm, this means a strip thickness d of the soft-magnetic metal strip of 10 µm<d<20 µm.

The metal strip may have a Br/Bm ratio>80%, Bm being measured at 200 mA/cm.

In a further embodiment of the invention, it is provided that the metal strip has a fish scale pattern, e.g., on one or more surfaces of the strip, with a structure oriented perpendicular and oblique with respect to the longitudinal direction of the strip. Such a pattern can for example be obtained in a controlled manner by reducing the casting pressure and/or increasing the casting speed. Further opportunities for influencing the surface topology of the strip in a controlled manner are for example offered by a surface structuring of the casting roller, which forms a corresponding structuring on the surface of the strip, or by a subsequent laser scribing of the soft-magnetic metal strip.

By means of suitable comparative tests, it was found that the influence of these geometric parameters is stronger than the influence of the alloy composition of the metal strip with alloying components of silicon, boron, niobium and copper in more than 73% iron by atomic weight.

There are therefore no considerable differences between a metal strip from an alloy with the composition $Fe_{75.5}Cu_1Nb_3Si_{12.5}B_8$ and a metal strip from an alloy with the composition $Fe_{73.5}Cu_1Nb_3Si_{13.5}B_9$, so that both alloys have maximum induction values in the above thickness-to-roughness ratios. In comparison, strip variants of a thinner and rougher metal strip exhibit better AC magnetic values than a smooth metal strip with a roughness approaching zero or a metal strip which is thicker than 50 µm.

In this context, it is advantageous if the metal strip is thermally annealed at a temperature between 500° C. and 600° C. for 0.5 hours to 2 hours in a longitudinal field of 5 A/cm to 15 A/cm. After the annealing process, the metal strip has a quasi-stationary coercive field strength irrespective of strip quality in terms of thickness and roughness, an AC-determined coercive field strength of the metal strip increasing in a linear fashion with a strip thickness-to-roughness ratio.

Any of the above embodiments of the metal strip can be wound in order to specify a magnet core. This magnet core can be used in various applications, for example in an AC ground fault current interrupter circuit, because the magnet core has a good permeability even at 50 Hz. As used herein, the term "ground fault current interrupter circuit" means a circuit for interrupting current delivered in a power distribution system whenever a ground fault current that exceeds a prescribed level is sensed. Desirably, in such an application, at a current frequency of less than 1000 Hz, the magnetic core has a Br/Bm ratio of greater than 80%.

It is provided that this soft-magnetic metal strip is used for AC-sensitive electromechanical components with a soft-magnetic toroidal strip-wound core. The soft-magnetic metal strip can, as explained above, be used for ground fault current interrupters with an earth leakage limit value $I_{max} \leq 30$ mA. The soft-magnetic metal strip can also be used for a speed sensor in co-operation with a segmented permanent magnet disc.

In addition, in certain embodiments the soft magnetic metal strip disclosed herein may be amorphous.

In an embodiment, soft magnetic metal strips disclosed herein can be used in distribution transformer cores, e.g., constructed according to the methods disclosed in U.S. Pat. No. 6,299,989.

BRIEF DESCRIPTION OF DRAWINGS

The embodiments disclosed herein can be more clearly understood based on diagrams of the following figures, of which:

FIG. 13 is a graph showing induction amplitudes at an exciting field strength of 10 mA/cm as a function of the strip thickness to peak-to-valley height ratio of an amorphous VITROVAC 6030 Z strip material.

DETAILED DESCRIPTION OF SPECIFIC EMBODIMENTS

As a part of the production monitoring of the nanocrystalline $Fe_{75.5}Cu_1Nb_3Si_{12.5}B_8$ alloy, a random test was carried out to determine the effect of strip thickness and strip roughness on the magnetic quality obtainable after heat treatment. For this purpose, the strip thickness of a strip batch (KA 1283, batch 7 kg, strip width 11 mm) was varied between approximately 16 μm (micrometers) and approximately 35 μm by reducing the roller speed during the shot process. By reducing the casting pressure towards the end of the shot, it was finally attempted to increase the strip roughness while maintaining the strip thickness (at approximately 35 μm). Across the shot process, strip samples of varying thickness and roughness were taken from this batch, and toroidal strip-wound cores with dimensions of 22 mm×16 mm×strip width were wound from these samples for further magnetic investigations.

Included into these investigations was a series of various KA batches of the $Fe_{73.5}Cu_1Nb_3Si_{13.5}B_9$ alloy, wherein the production parameters were varied with the aim of improving ductility in the production state. From these batches, toroidal strip-wound cores with dimensions of 22 mm×16 mm×strip width were likewise produced for magnetic investigations.

The toroidal strip-wound cores were tempered in a hydrogen atmosphere in the longitudinal field. The detailed tempering conditions were as follows: 1 h holding time in the longitudinal field (AC field of approximately 10 A/cm) at 540° C., cooling with 1 K/min.

Figure 1:
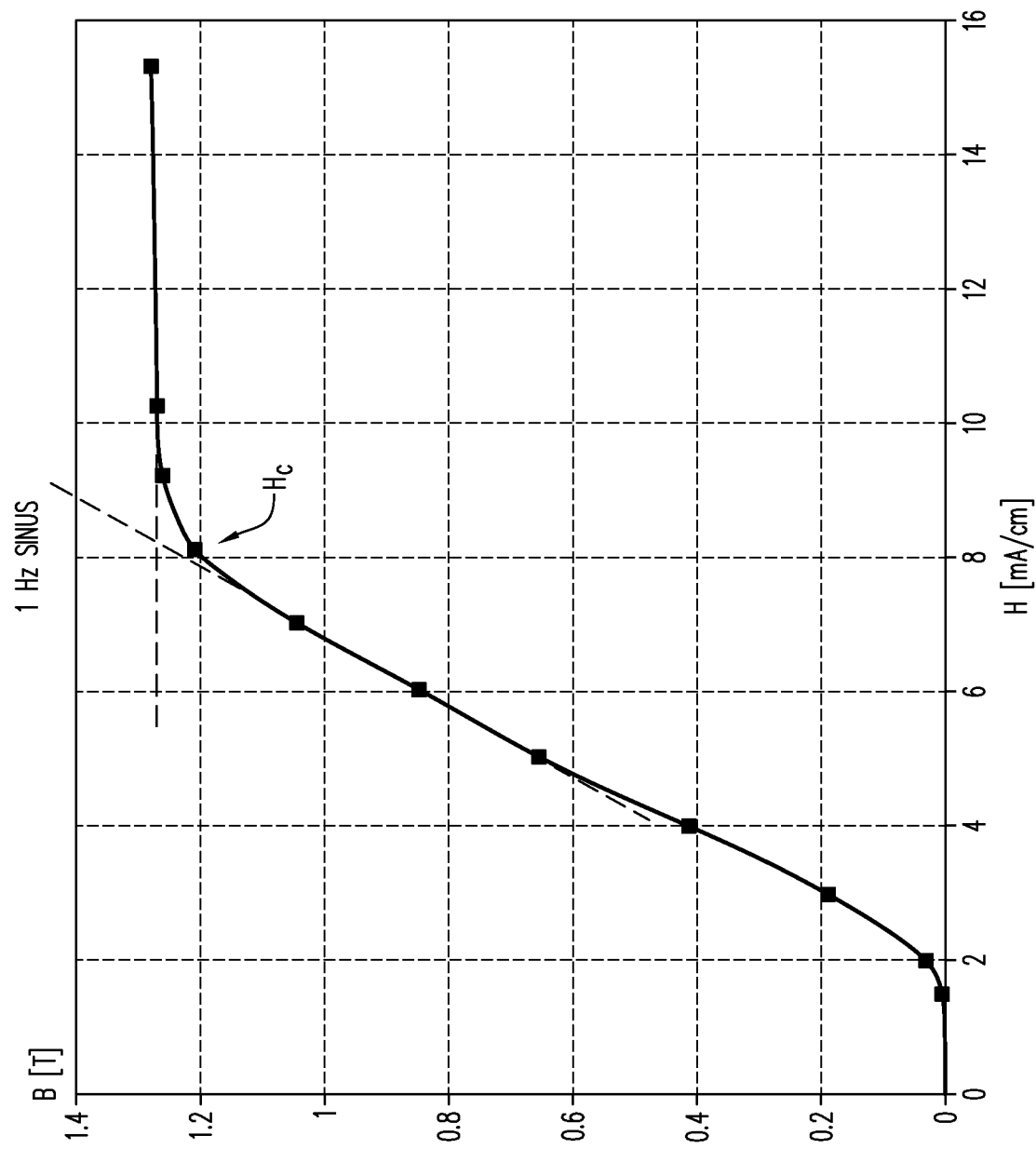
FIG. 1 is a graph illustrating the definition of a dynamic coercive field strength.

The quasi-static hysteresis loops and the 50 Hz-normal magnetisation curves were measured. The 50 Hz-characteristics were "measured in the decreasing exciting field", which corresponds to a measurement of the demagnetized core. From the normal magnetisation curves, the dynamic coercive field strength $H_c$ was evaluated in accordance with FIG. 1; this value, which is identified as $H_c$(dyn) in the subsequent figures, is the exciting field strength at which saturation or maximum permeability is just reached.

To characterize the strip geometry, the average strip thickness was determined from weight per meter, and the roughness was measured on the underside of the strip (across the strip direction).

Example 1

Example 1 is based on investigations of roughness and strip thickness on the alloy $Fe_{75.5}Cu_1Nb_3Si_{12.5}B_8$ as batch KA 1283.

Figure 2:
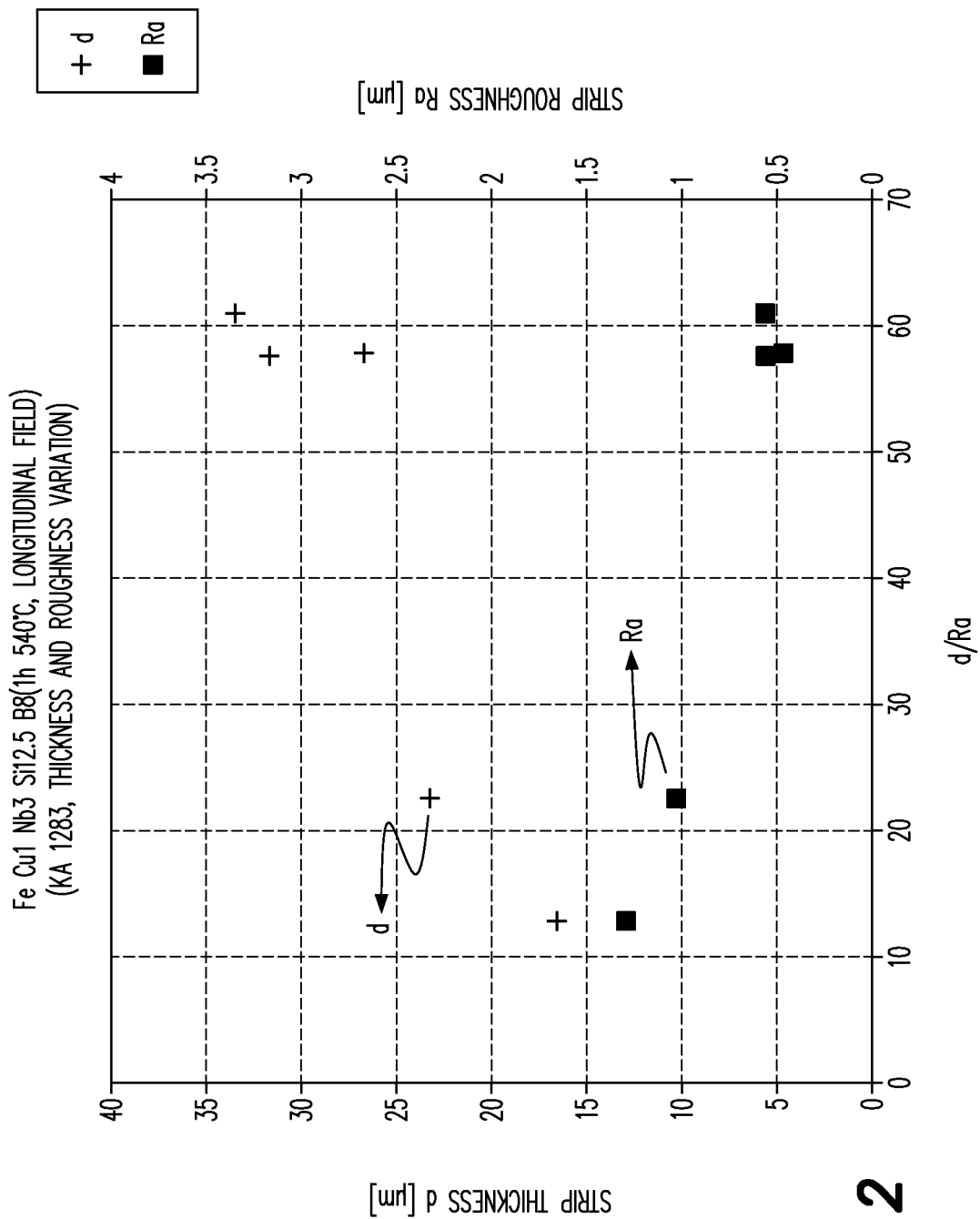
FIG. 2 is a graph showing values of strip thickness and peak-to-valley height at various points of an examined metal strip.

The strip thickness to peak-to-valley height ratio $d/R_a$ ranges from approximately 10 to 60. FIG. 2 shows the relevant variations of strip thickness and peak-to-valley height. The figure shows that the thinner strips as a rule have a greater roughness in absolute terms.

The average quasi-statically measured coercive field strength is $H_c$=7.5±1 mA/cm (at $H_{max}$=50 mA/cm)

The average quasi-statically measured remanence ratio is approximately $B_r/B_m$=0.97±0.01 (at $H_{max}$=200 mA/cm).

Figure 3A:
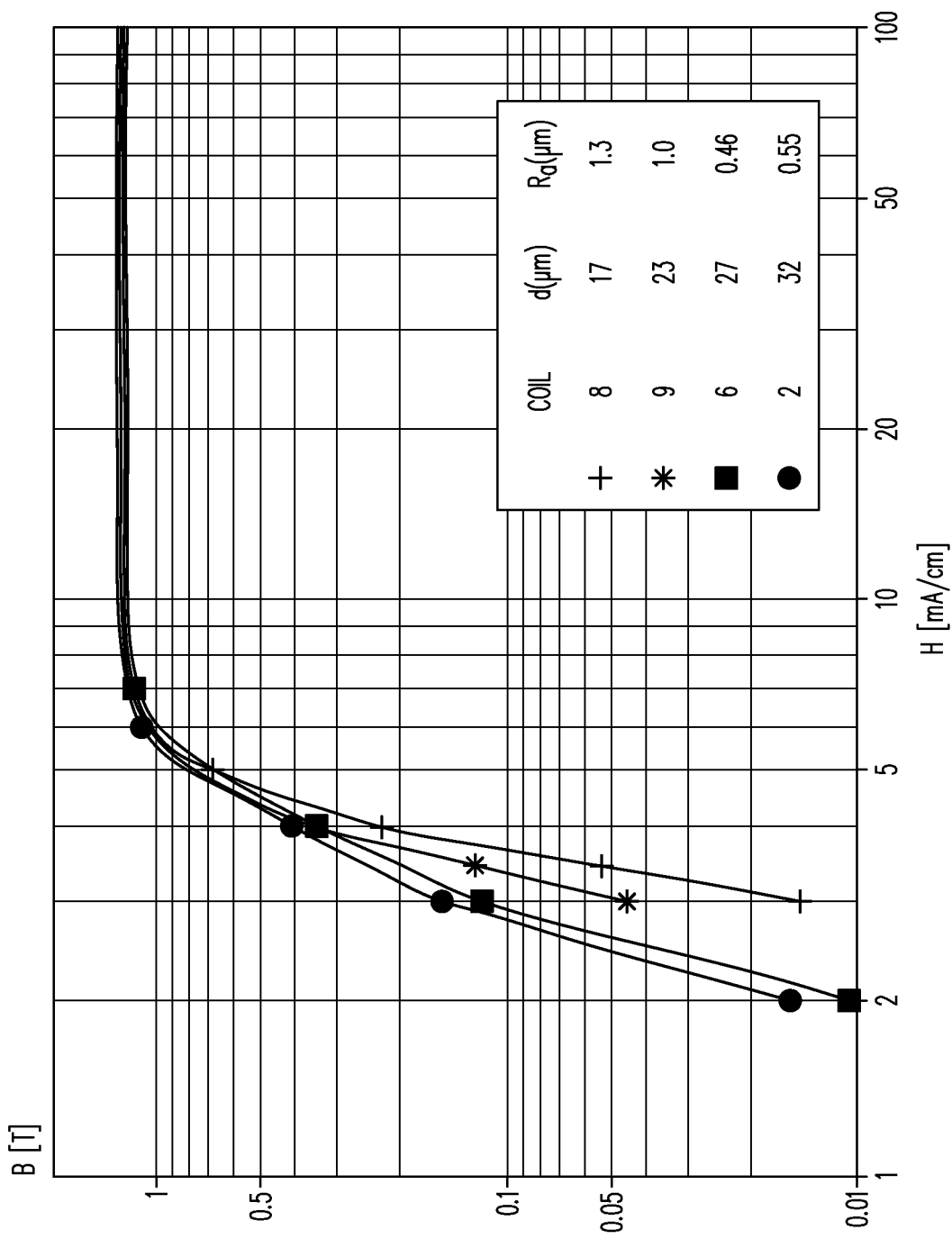
FIG. 3 is a graph showing induction amplitudes (FIG. 3a) and amplitude permeabilities (FIG. 3b) as a function of the exciting field amplitude at sinusoidal excitation with 1 Hz for various metal strip grades.
Figure 3B:
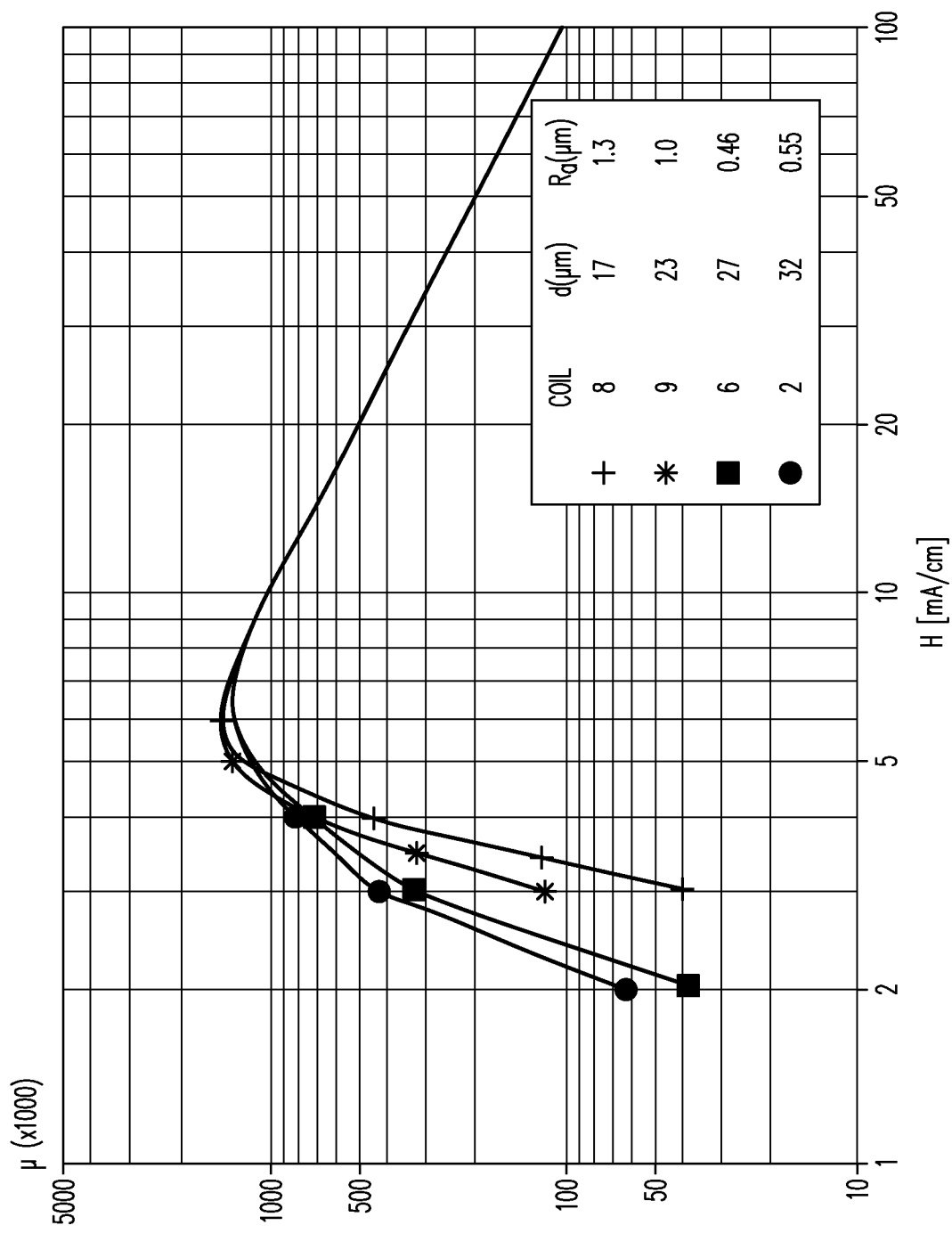

FIG. 3 shows the normal magnetisation curve ($B_{max}$ over H) measured at 1 Hz (sinusoidal field strength) and the associated amplitude permeability μ.

In the thicker and smoother strips, slightly better values are indicated. As a whole, however, the influence of strip thickness and strip roughness on the quasi-static and 1 Hz-measured values is low and virtually accounted for by questions of measuring accuracy. In contrast to this, comparative investigations on amorphous materials such as VC 6150 Z and VC 6030 Z found a significant worsening of $H_c$ and $B_r$ as the $R_a/d$ ratio increases.

Figure 4A:
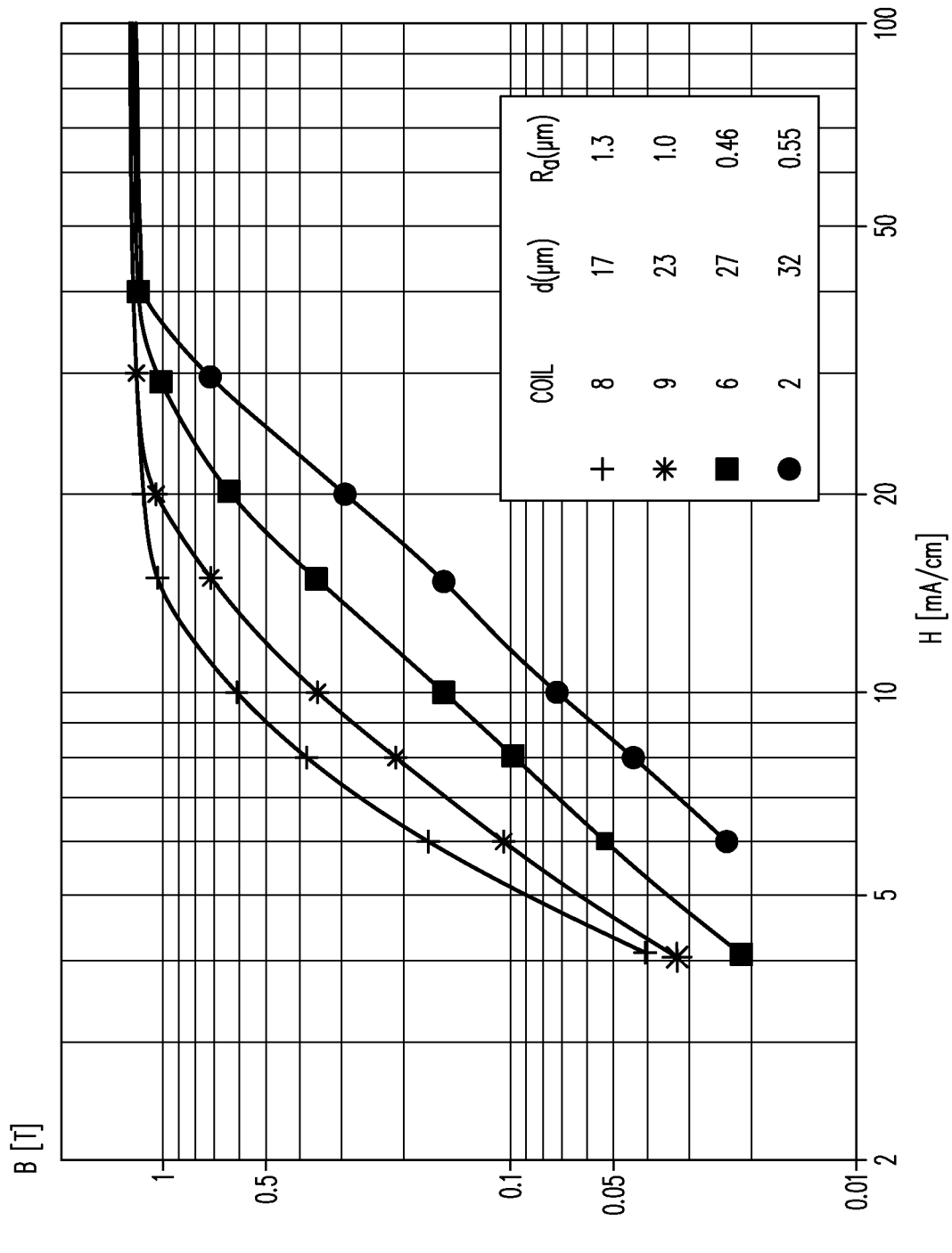
FIG. 4 is a graph showing induction amplitudes (FIG. 4a) and amplitude permeabilities (FIG. 4b) as a function of the exciting field amplitude at sinusoidal excitation with 50 Hz for the metal strip grades from FIG. 3.
Figure 4B:
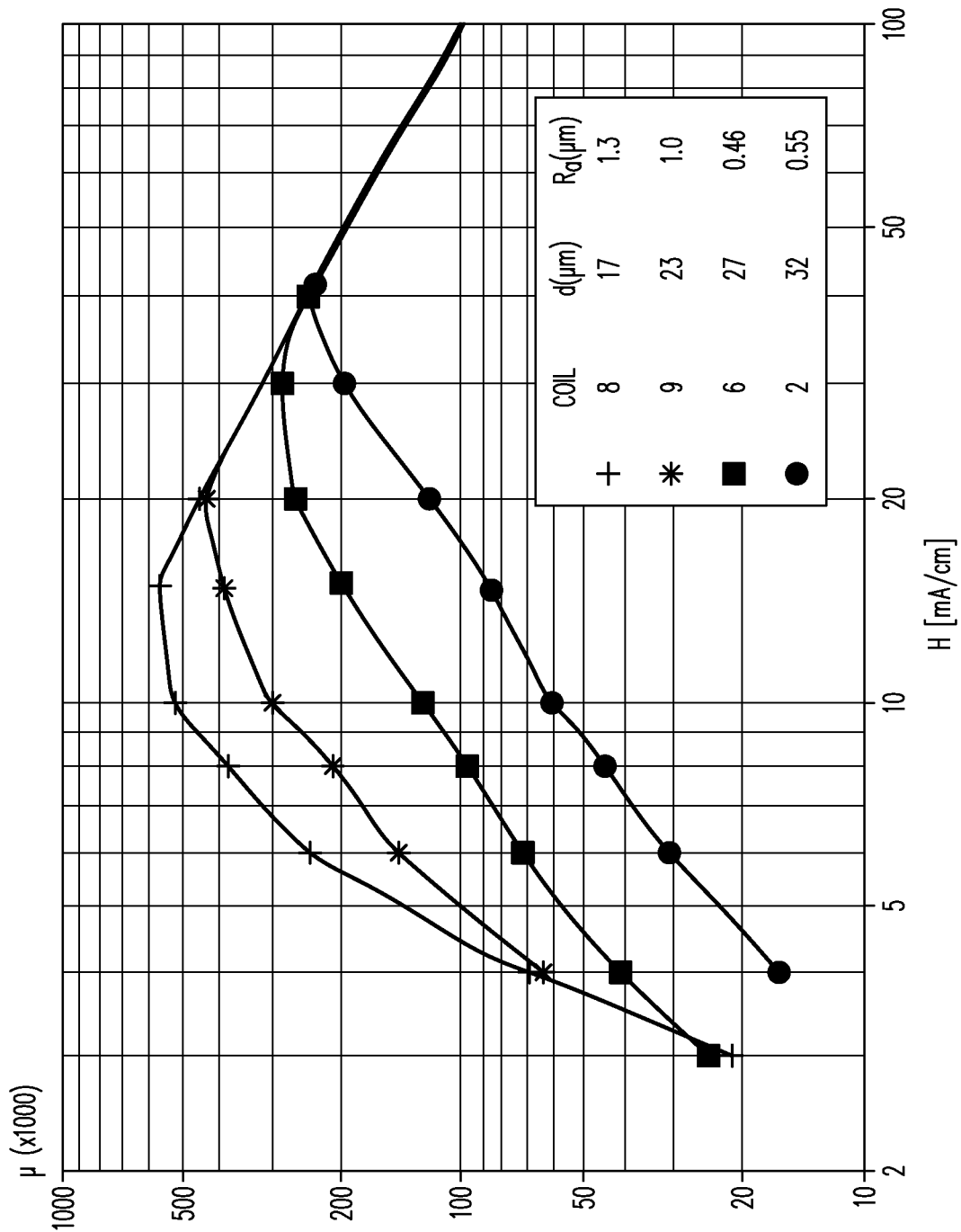

At higher measuring frequencies, the situation is significantly different. Even at 50 Hz there are noticeable differences between the various strip grades. FIG. 4 shows the normal magnetisation curve ($B_{max}$ over H) measured at 50 Hz (sinusoidal field strength) and the associated amplitude permeability μ. A comparison between 1 Hz and 50 Hz shows that the 50 Hz-characteristic is virtually completely determined by anomalous eddy currents. As explained above, the classic eddy current effects can be ignored. Striking is that the thin and rough strips in particular provide much better 50 Hz-magnetic values than the thicker, smooth strips.

Figure 5:
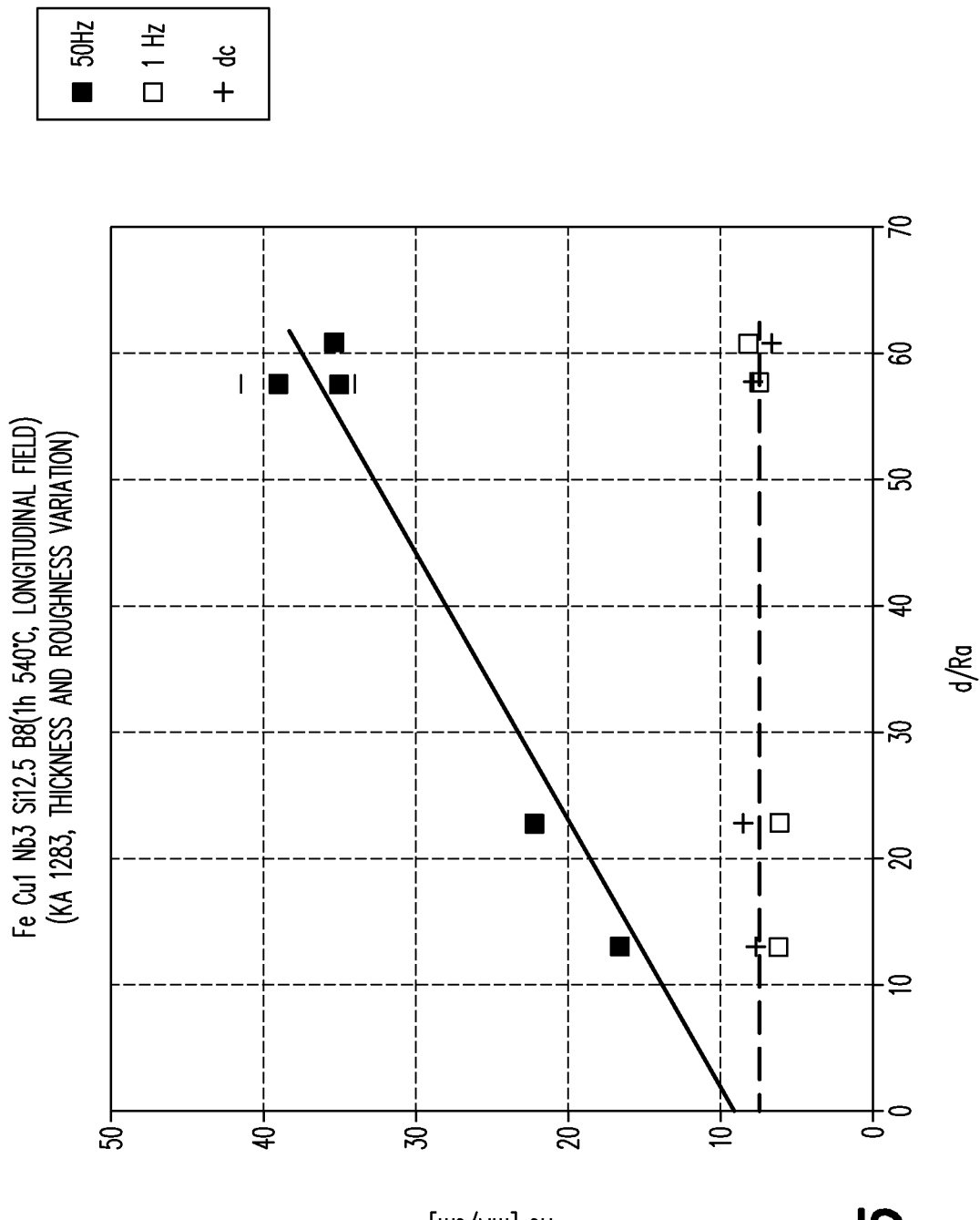
FIG. 5 is a graph showing the dynamic coercive field strength as a function of the strip thickness to peak-to-valley height ratio of an individual batch.

FIG. 5 shows the dynamic coercive field strength $H_c$ (according to definition in FIG. 1) as a function of the $R_a/d$ ratio. The values for f=1 Hz coincide with the quasi-statically measured values and, as mentioned above, show virtually no dependence on the $R_a/d$ ratio. The eddy current-determined 50 Hz-values, on the other hand, increase linearly with $R_a/d$, which matches the theoretical expectations explained above. The extrapolation of the 50 Hz-values for $R_a/d \geq 0$ leads to a value which approximately corresponds to the quasi-static coercive field strength.

Figure 6:
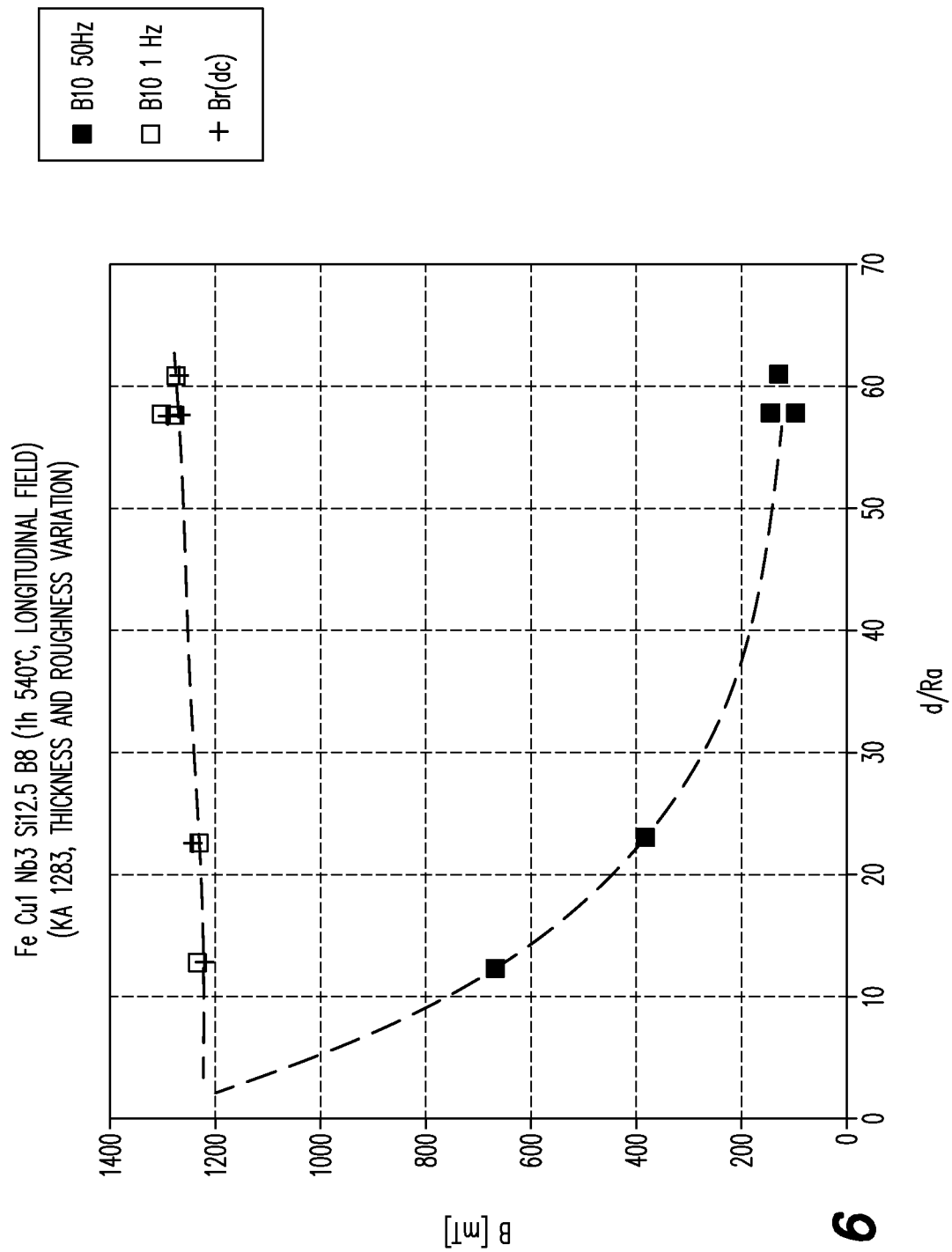
FIG. 6 is a graph showing induction amplitudes at an exciting field strength of 10 mA/cm as a function of the strip thickness to peak-to-valley height ratio of a first metal strip alloy.

For possible application in 30 mA-ground fault current interrupters, the induction amplitude $B_{10}$ at an exciting field amplitude of 10 mA/cm is relevant. The consequences of $R_a/d$ for this variable are illustrated in FIG. 6. $B_{10}$ increases noticeably as strip thickness decreases and roughness increases. The maximum value of $B_{10}$, i.e. $B_{10}$ approximately equal to $B_s$, is to be expected if the dynamic coercive field strength $H_c$ falls below 10 mA/cm. This is for example implemented for lower frequencies.

Example 2

Example 2 is based on investigations of roughness and strip thickness on the alloy $Fe_{73.5}Cu_1Nb_3Si_{13.5}B_9$ from various batches and on investigations of further influencing parameters.

Figure 7:
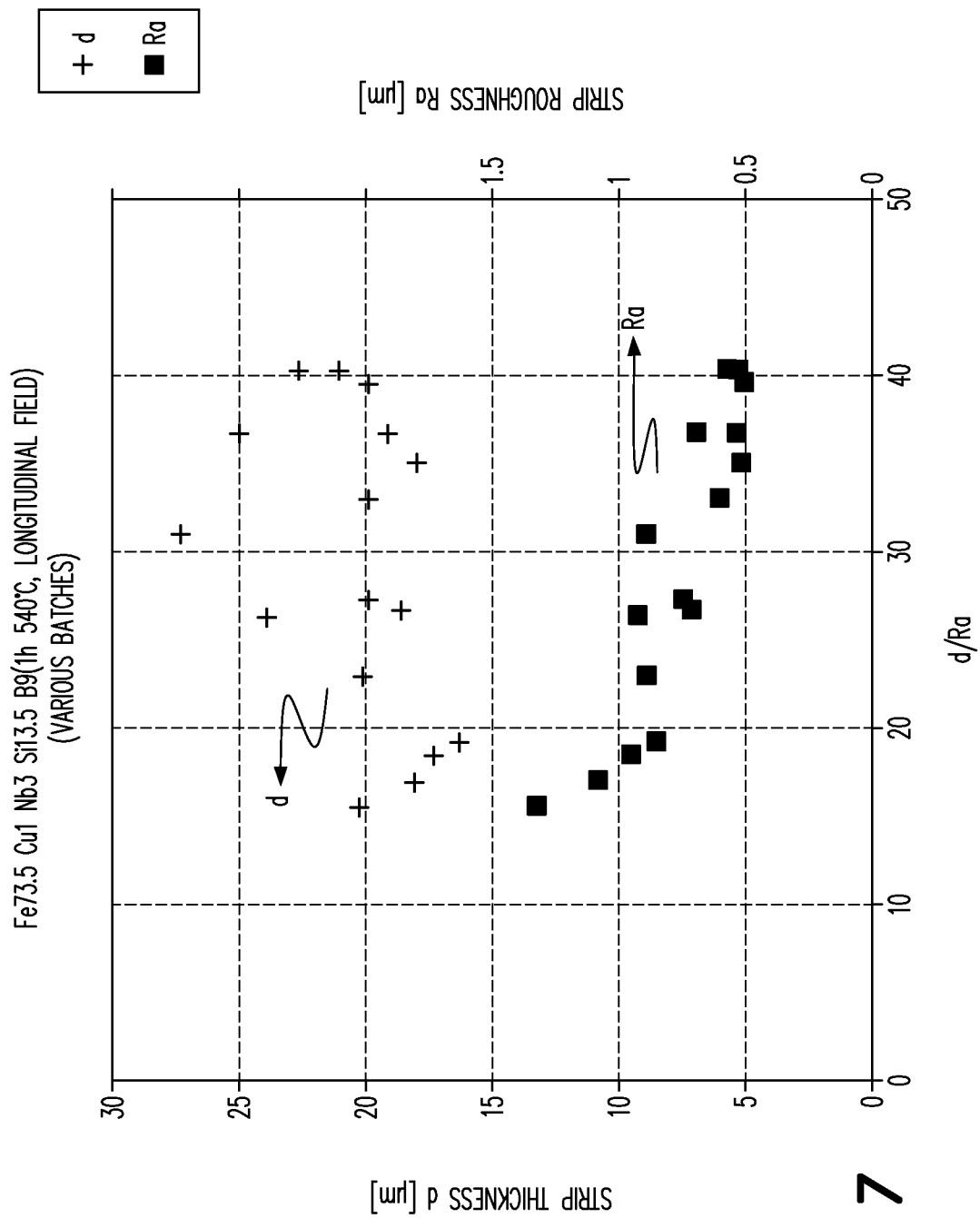
FIG. 7 is a graph showing values of strip thickness and peak-to-valley height ratio of various metal strip batches.
Figure 8:
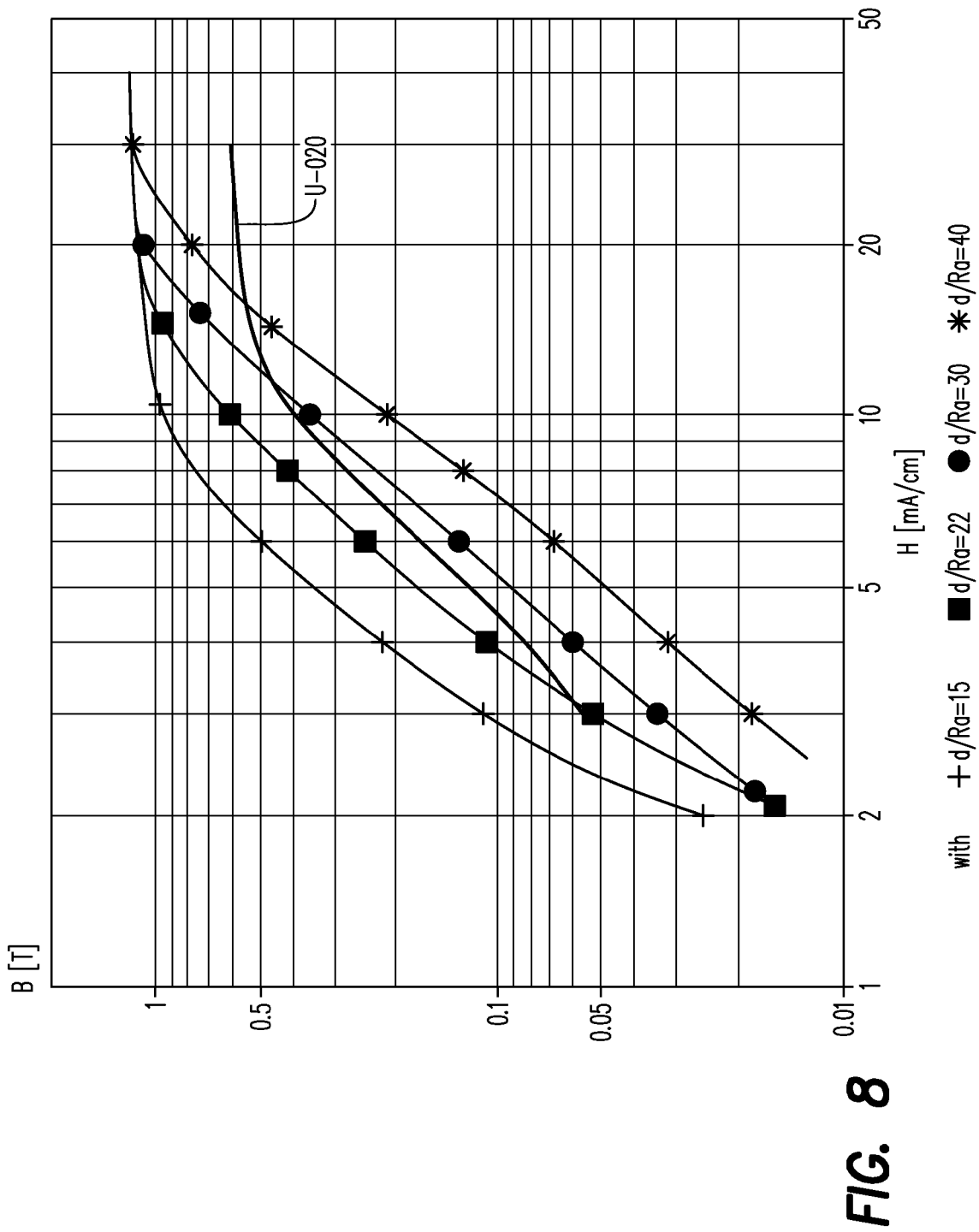
FIG. 8 is a graph showing induction amplitudes and amplitude permeabilities as a function of the exciting field amplitude at sinusoidal excitation with 50 Hz for different metal strip grades, comparing a nanocrystalline alloy to a coarse-crystalline NiFe alloy Ultraperm 10 with the characteristic 020.

The results from various batches of the alloy $Fe_{73.5}Cu_1Nb_3Si_{13.5}B_9$ are shown in FIGS. 7 to 11. Here, too, magnetic values are determined by strip roughness and strip thickness as discussed above. In contrast to the above case, the influence of roughness appears to be more explicit here, because the average strip thickness does not vary as strongly as in example 1 (FIG. 7).

The values of the static coercive field strength are approximately 3.5 mA/cm. This value, which is significantly lower than that for the $Fe_{75.5}Cu_1Nb_3Si_{12.5}B_8$ alloy of example 1, is partly due to the fact that the static loop was modulated with only approximately 20 mA/cm. In a comparable modulation of $H_{max}$=50 mA/cm, the $H_c$ values are slightly higher, at approximately $H_c$=5 mA/cm.

The 50 Hz-magnetic values are slightly better in the case of the alloy ($Fe_{73.5}Cu_1Nb_3Si_{13.5}B_9$) than those of the $Fe_{75.5}Cu_1Nb_3Si_{12.5}B_8$ alloy. This is shown most clearly in comparing the $B_{10}$ values at the same $d/R_a$ ratio (cf. FIGS. 8 and 10). In this context, it should be noted that the alloy, with 13.5% Si by atomic weight and $\lambda_s=2 \times 10^{-6}$ and $K_u=20$ J/m³, has both a magnetostriction constant $\lambda_s$ which is lower by the factor of two and a lower magnetic field-induced anisotropy $K_u$ (the corresponding values for the alloy with 12.5% Si by atomic weight are $\lambda_s=3.5 \times 10^{-6}$ and $K_u=40$ J/m³). In view of this the alloy with 13.5% Si by atomic weight offers better basic conditions for both the purely soft-magnetic properties and the dynamic properties.

Figure 9:
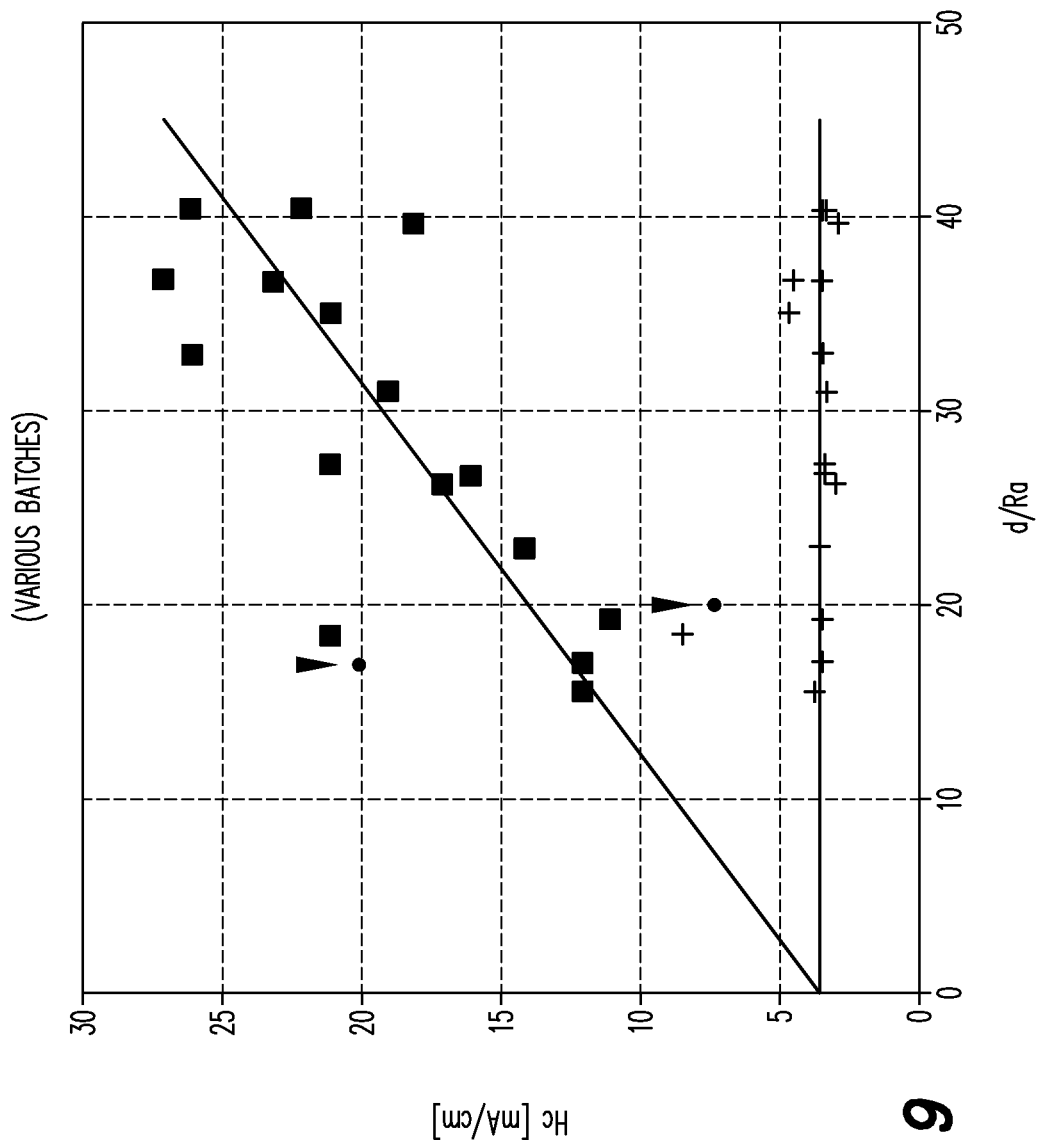
FIG. 9 is a graph showing the dynamic (50 Hz) and static (dc) coercive field strength as a function of strip thickness and peak-to-valley height ratio of various batches.
Figure 10:
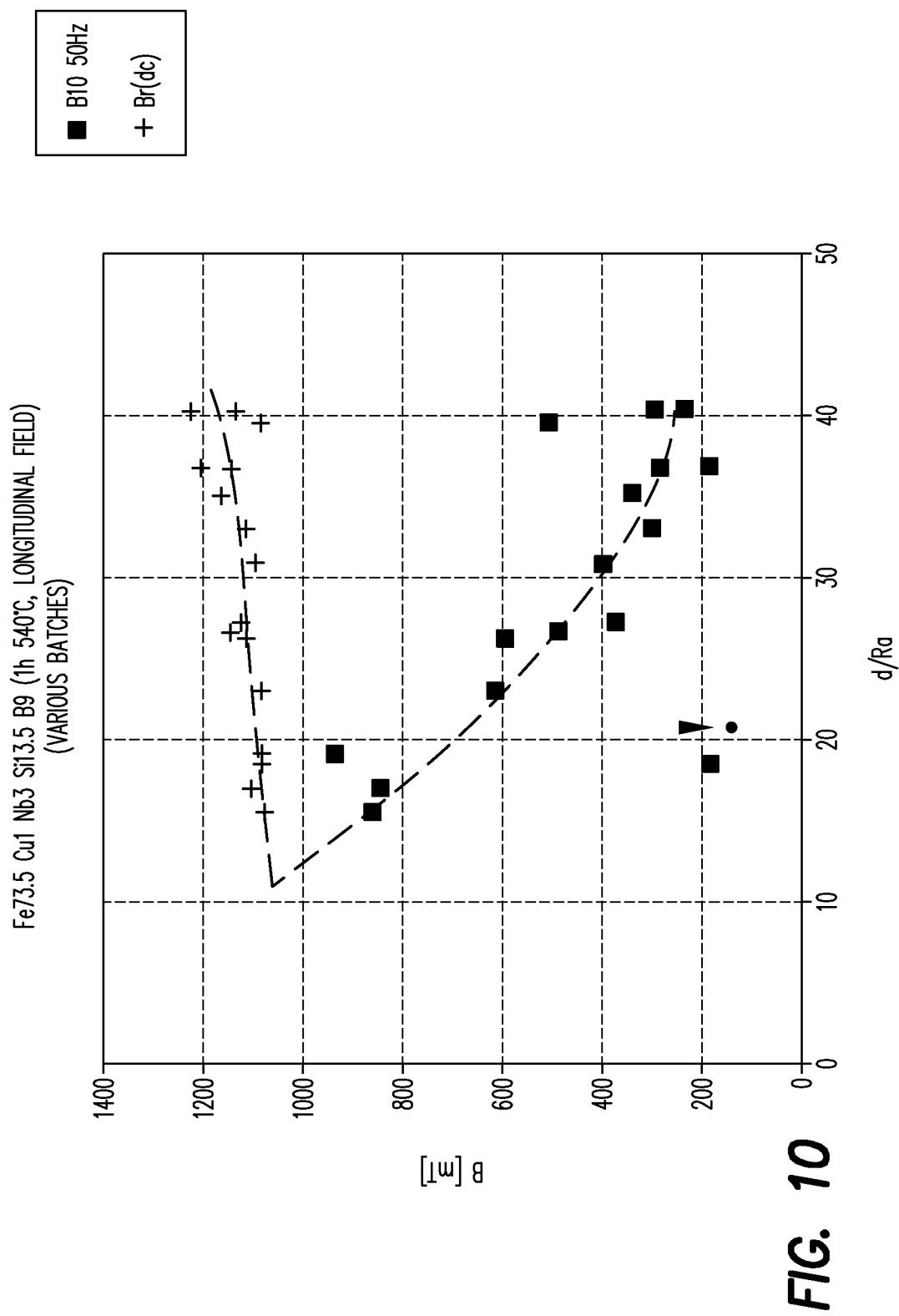
FIG. 10 is a graph showing induction amplitudes at an exciting field strength of 10 mA/cm as a function of the strip thickness to peak-to-valley height ratio of a second metal strip alloy.

Looking at FIGS. 9 and 10 more closely, shows an outlier (identified by an exclamation mark); this is a strip from a batch KA 1114. Noticeable are the relatively poor dynamic properties, irrespective of a relatively low $d/R_a$ ratio, and the static coercive field strength, which is more than twice as high as in other batches. This strip further has a hysteresis loop which was displaced strongly with respect to the field zero point. A striking aspect of the strip geometry was a longitudinal groove with a depth of more than 5 μm, which was not included in the $R_a$ value, i.e. no measurements were taken across this groove. The groove is due to slag particles in the nozzle, which eventually resulted in a splitting of the strip and the premature abortion of the shot.

In materials with a rectangular hysteresis loop, the magnetisation characteristic is relatively sensitive to exact measuring conditions and the state of the core before measurement. The characteristics discussed so far were determined in a decreasing magnetic field (corresponding to a measurement of the demagnetized core) on cores "as tempered, several days later". Compared to such a reference curve, the result is:

1. A reduction of the induction values by up to 50-100 mT after DC field preload (in the present case approximately 1 A/cm).

2. An increase of the induction values up to 100-200 mT after the beating of the core.

Figure 11A:
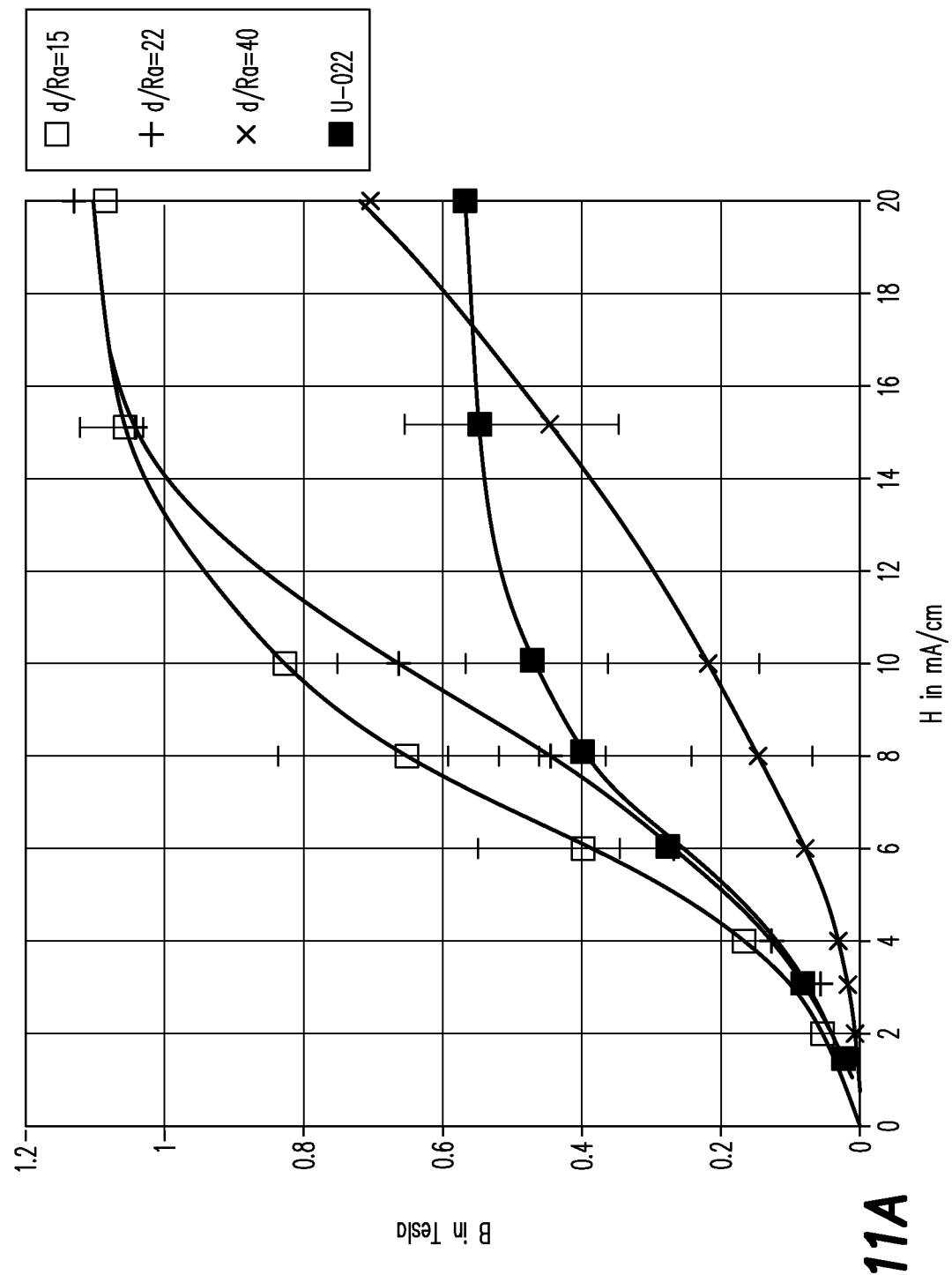
FIG. 11a is a graph showing induction amplitudes at 50 Hz of three nanocrystalline metal strip grades compared to a coarse-crystalline Ultraperm 200 metal strip of an NiFe alloy.
Figure 11B:
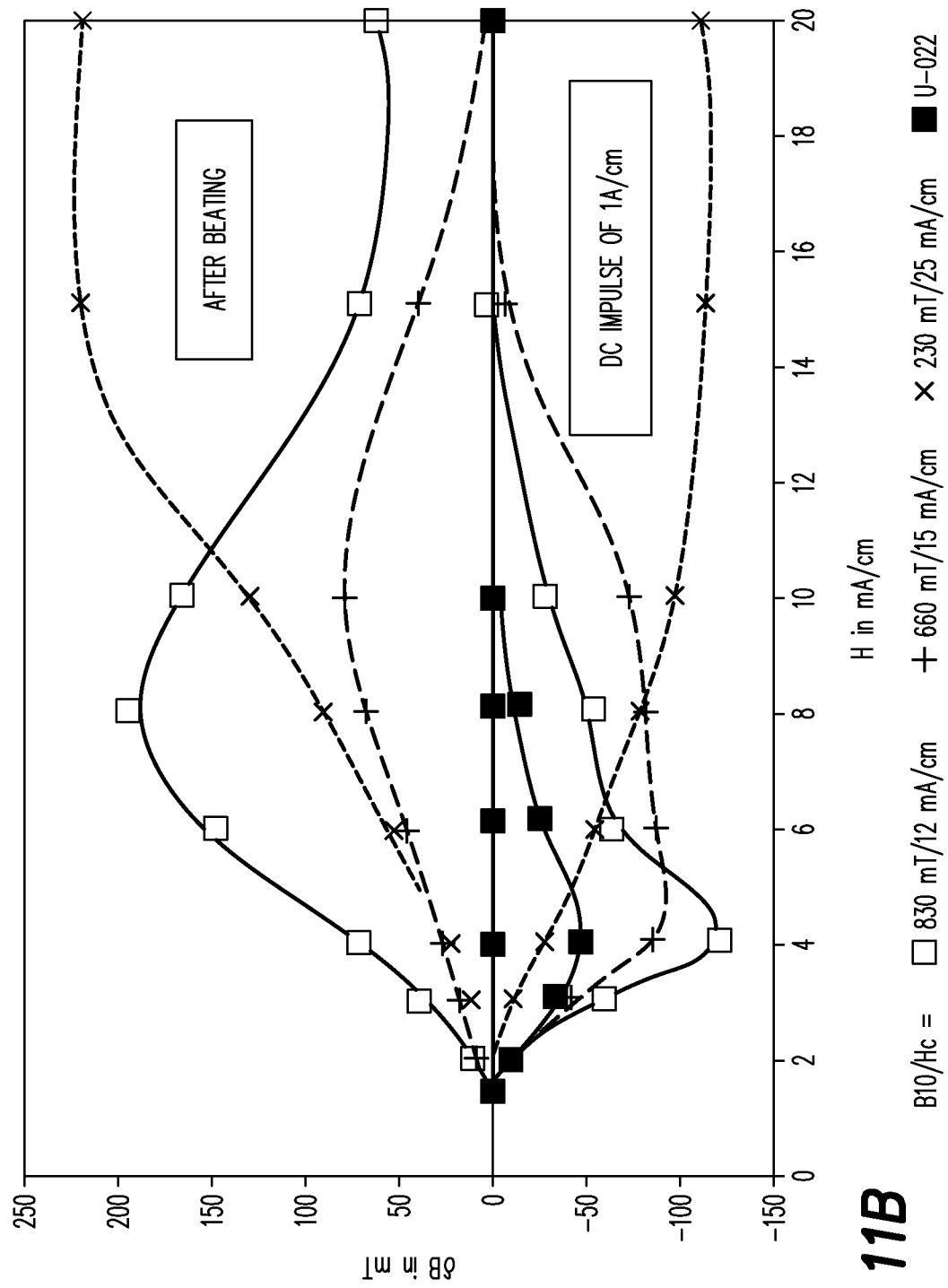
FIG. 11b is a graph showing the changes of the induction amplitudes following a DC field impulse and beating load.

FIG. 11 shows these changes as a function of the exciting field together with the B-H normal magnetisation curve compared to Ultraperm 200. It can be seen that the changes in the soft-magnetic nanocrystalline metal strip are significantly more pronounced than in the coarse-crystalline Ultraperm 200 metal strip of an NiFe alloy.

Remarkable are the changes of the magnetic values following a beating of the metal strip. While the batches of the $Fe_{73.5}Cu_1Nb_3Si_{13.5}B_9$ alloy composition investigated here exhibit a noticeable change of magnetic values, virtually no change was observed in the $Fe_{75.5}Cu_1Nb_3Si_{12.5}B_8$ alloy (irrespective of higher magnetostriction) and in Ultraperm 200. At the moment, this phenomenon can only be understood to indicate that the handling of the cores can influence their magnetic values in some cases.

The influence of a DC field impulse, on the other hand, was much more reproducible and found in all of the cores which were investigated. This phenomenon reflects the irreversible character of the basic magnetisation processes (pinning of domain walls, after-effects). This effect may occasionally be uncontrolled in the measuring process, i.e. if power is switched on and off at a certain point, depending on the ohmic load in the primary and secondary circuits. This is caused by current surges due to inductive retroactivity, which may move the material temporarily into saturation.

In practical terms, this means that the induction values of nanocrystalline materials with a rectangular hysteresis loop can currently only be specified with a tolerance of approximately ±100 mT at a given working point for one and the same core.

Example 3

Example 3 is based on investigations on an amorphous comparative material VITROVAC 6030 Z (Z denotes a material with a rectangular hysteresis loop) with respect to roughness and strip thickness.

Figure 12:
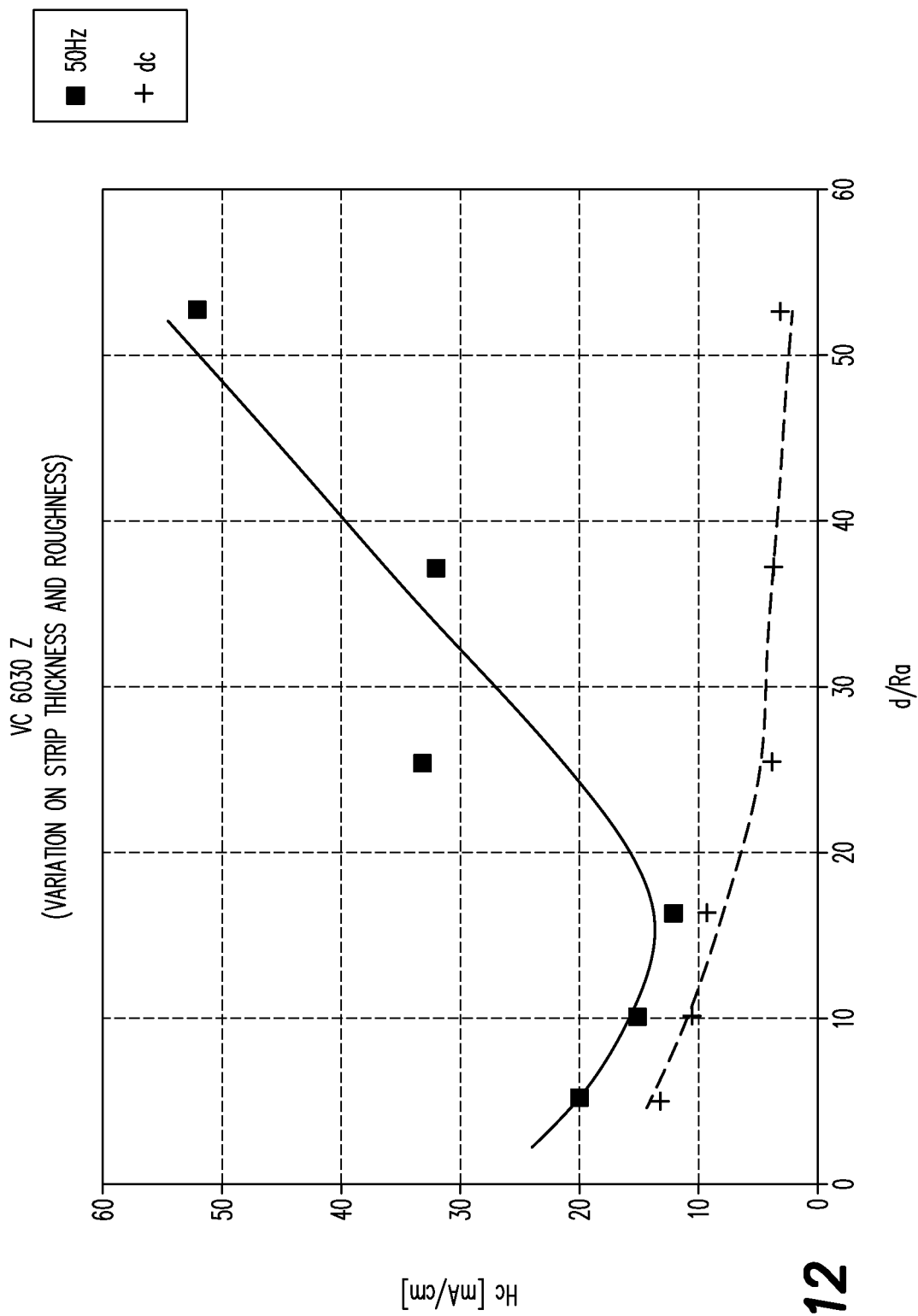
FIG. 12 is a graph showing the dynamic coercive field strength as a function of the strip thickness to peak-to-valley height ratio of an amorphous VITROVAC 6030 Z strip material.

Compared to the nanocrystalline material, FIGS. 12 and 13 illustrate a corresponding evaluation of data measured at 50 Hz on VITROVAC 6030 Z. For $d/R_a>15$, the picture is analogous. For $d/R_a<15$ (d=15 μm, $R_a$=1.5 μm to 3 μm), however, a decline of the magnetic values is observed in contrast to the linear increase in nanocrystalline metal strip. This is essentially due to the influence of roughness on quasi-static coercive field strength and residual magnetisation.

The results for VITROVAC 6030 Z show that the possibilities for improving the dynamic properties by reducing the strip thickness and, in the case of metal strip with rectangular hysteresis loops, by increasing the roughness of the strip are limited.

The present investigations show that the 50 Hz-properties of amorphous and nanocrystalline materials with a rectangular hysteresis loop are decisively determined by the ratio of strip thickness d to peak-to-valley height $R_a$. The influence of $d/R_a$ is at least as important as that of the uniaxial anisotropy $K_u$ induced in the strip direction, which was noted above. In terms of production security, $d/R_a$ has an almost critical role to play, because this parameter is much more difficult to control than the induced anisotropy $K_u$, which is well defined by alloy composition and tempering treatment.

The best magnetic values have so far been observed in thin (15 to 20 µm) and rough ($R_a$=1 to 1.5 µm) strips with a $d/R_a$ ratio between 10 and 20. Earlier investigations of VITROVAC 6030 Z, however, indicate that the magnetic values become poorer if the $d/R_a$ ratio is too low, owing to increasing hysteresis losses. The critical limit for nanocrystalline alloys has so far not been reached.

The physical reason for the improvement of magnetic values with increasing roughness and decreasing strip thickness could be a dynamic domain refinement in the nanocrystalline metal strip. The latter is presumably due to the end domain structures present around surface defects (e.g. air pockets in the strip underside, coarser crystalline precipitations) and to comparable magnetisation inhomogeneities.

For good magnetic values, the strip should be as thin as possible (average strip thickness less than 20 µm if possible) and have a "defined" roughness (about or above $R_a$=1 µm).

The demand for a rougher strip results in an improvement of dynamic magnetic values if the magnetisation process involves a great degree of wall displacement. This applies to the fullest extent to materials with a rectangular hysteresis loop and conditionally to round hysteresis loops.

A possible magnetisation process for materials with rectangular hysteresis loops involves magnetisation by way of the movement of 180 degree-domain walls at right angles to the longitudinal direction of the strip. Owing to the pronounced spatial localization of the magnetisation changes involved in this process, there are increased, so-called anomalous, hysteresis losses. The increase of these losses is the higher, the fewer domains participate in the magnetisation process.

The investigation of frequency dependence shows that the magnetisation characteristic of nano crystalline ferromagnetic materials with a rectangular hysteresis loop can be described very well within the Bertotti theory, which has been used with great success for amorphous alloys, i.e. Bertotti, J. Mag. Mat., 1986, pages 54 to 57. According to this theory, the contribution of anomalous eddy current losses is $$P_{Fe}^{nano} \propto \sqrt{\frac{V_o}{\rho_{el} \cdot n_0}} \cdot (f \cdot \hat{B})^{3/2} \quad (1)$$

wherein
$\rho_{el}$ is the resistivity,
$n_o$ is the number of domains per area unit in the quasi-static passage through the hysteresis loop,
$v_o$ is a minimum value by which the external field has to be increased in order to form a new domain or to initiate a movement of the pinned wall; $v_o$ is therefore closely linked to the static coercive field strength,
f is the remagnetisation frequency, and
B is the induction amplitude.

The power loss is generally specified by H dB/dt, the remagnetisation speed dB/dt being proportional to f·B. H is the external field required to compensate for the locally generated eddy current fields. From equation (1), we can therefore derive:

$$H - H_c^{stat}(B) \propto \sqrt{\frac{V_o \cdot f \cdot \hat{B}}{\rho_{el} \cdot n_0}} \quad (2)$$

wherein $H_c^{stat}$ (B) describes the development of the quasi-static hysteresis loop, which is mainly determined by coercitive field mechanisms. The contribution of the so-called classic eddy currents is ignored in this context, which is justified for frequencies which are not too high (f<1000 Hz). An estimate for f=50 Hz and B=1 T for the eddy current field resulting from classic eddy currents delivers only fractions of mA/cm, for example.

The critical parameters in equations (1) and (2) are the domain density $n_o$ and the nucleation field strength $v_o$. Below, it has to be explained how both of these variables are connected to surface roughness and strip thickness.

With magnetisation in the strip plane, magnetic surface poles develop at geometrical deviations from an ideal flat surface, which results in local stray fields. To reduce the stray field energy associated therewith, magnetisation inhomogeneities form at the surface defects, which in extreme cases are scallop-like end domains, e.g. at the air pockets of the strip underside. This is connected to the consequence of a slower fatiguing into ferromagnetic saturation and in particular to a reduction of the remanence ratio according to $$J_r/J_s \approx 1 - \frac{1}{2} N_{eff} \sqrt{\frac{J_s^2}{2\mu_0 K}} \quad (3a)$$

wherein $$N_{eff} \approx \frac{\pi^3}{8} \cdot \frac{R_a^2}{\lambda \cdot d} \quad (3b)$$

is an average demagnetization factor determined by surface roughness. d further describes the strip thickness, K the anisotropy in the longitudinal direction of the strip and λ an effective wave length which is a measure for the extent and the spacing of the surface defects.

In this case, an increased strip roughness should also result in an increased nucleation probability for new domains. Investigations of the dynamic domain structure on FeSi sheet metal and amorphous metals indicate that new domains are formed with increasing frequency, preferably at surface irregularities.

An estimation of the influence of $R_a$ on the domain density $n_o$ can for example be based on the following greatly simplified model:

Domains which initiate remagnetisation preferably form at surface irregularities and therefore have approximately the effective extent λ. For $N_o$ domains, this results in an effective cross-sectional component $N_0 \cdot \lambda/b = n_0 \cdot \lambda \cdot d$ (b=strip width, $n_0 = N_0/(b \cdot d)$). This cross-sectional component on the other hand reduces the residual magnetisation and is therefore proportional to $1 - J_r/J_s$. From this follows:

$$n_0 \approx \frac{1 - J_r/J_s}{\lambda \cdot d} \propto \frac{R_a^2 \cdot J_s}{(\lambda \cdot d)^2 \cdot \sqrt{K}} \quad (4)$$

We arrive at a similar term with regard to $R_a$-, d- and K-dependence if we start from the average stray field energy $\frac{1}{2} N_{\text{eff}} J_s^2$ and equate this to the domain wall energy required to generate $n_o$ domains per cross-section.

In determining the effect on eddy current losses, the relevant coercive field mechanisms have to be taken into account as well. In this context, a distinction has to be made between two different cases:

a) $H_c$ is Determined by Pinning at Surface Defects

In this case, the coercive field strength is substantially determined by pinning at the surface defects. The minimum field strength $V_c$ for involving an as yet pinned domain in the magnetisation process is then analogous to $H_c$ according to $$V_0 \propto H_c \propto \frac{R_a}{\lambda \cdot d} \frac{\sqrt{A \cdot K}}{J_s} \quad (5a)$$

From equation (2) for the eddy current field then follows $$H - H_c^{stat}(B) \propto \sqrt{\frac{\lambda \cdot d}{R_a} \cdot K_u \cdot f \cdot \hat{B}} \quad (5b)$$

In this context, it should be noted that $H_c^{stat}$ is proportional to $R_a/d$ according to equation (5a), i.e. that it depends to a greater degree on $R_a/d$ than the anomalous eddy current losses. As a result, the magnetic values for strip which is too rough are poorer owing to increasing hysteresis losses.

b) $H_c$ is Independent of Surface Defects

In this case, $H_c$ is determined by nucleation or by pinning at intrinsic anisotropy fluctuations. Then $$V_0 \propto H_c \propto K/J_s \quad (6a)$$

the eddy current field following as $$H - H_c^{stat}(B) \propto \frac{\lambda \cdot d}{R_a} \sqrt{K^{3/2} \cdot f \cdot \hat{B}} \quad (6b)$$

This case is particularly important for nanocrystalline materials, where the average crystal anisotropy ($K_1$) can contribute decisively to $H_c$ owing to the finite grain size, in contrast to amorphous systems. In a consistent calculation, the term $K^{3/2}$ would here have to be replaced by $K_u^{1/2} < K_1 >$.

In this marginal case, the coercive field strength and thus the hysteresis losses are independent of the roughness of the strip. The result is a more efficient reduction of total losses with increasing roughness than in the above case of amorphous materials.

As a whole, the general propositions of the above model calculation seem to agree with the following experiment. We must, however, remain aware of the greatly simplified assumptions made in the above formulae.

To summarize, it can be said that the 50 Hz-characteristic of nanocrystalline (as well as amorphous) materials with a rectangular hysteresis loop is greatly affected by anomalous eddy current losses. The above investigations lead to the conclusion that the relationship between strip thickness d and surface roughness $R_a$ is an essential influencing parameter which may greatly exceed the effect of the alloy composition. The best magnetic values were found for a $d/R_a$ ratio<20, i.e. for thin strips (about 20 μm or less) with a relatively rough surface ($R_a$ about 1 μm or slightly more). With the alloy composition $Fe_{73.5}Cu_1Nb_3Si_{13.5}B_9$, therefore, twice as high induction values can be achieved at the operating point relevant for AC-sensitive 30 mA-ground fault current interrupters at Hc=10 mA/cm as with coarse-crystalline NiFe alloys (such as Ultraperm 10, 200). This offers the opportunity to reach such peak values and to provide suitable starting points for their reproducible generation.

The invention having been disclosed by reference to certain specific examples and embodiments, it will appreciated that the scope of the appended claims is not limited to these examples and/or embodiments.

What is claimed is:

1. A soft-magnetic metal strip, comprising:
   a nanocrystalline or amorphous structure, and
   a ratio of strip thickness to roughness d/Ra of 5≤d/Ra≤25;
   wherein the metal strip has a fish scale pattern with a structure oriented perpendicular and oblique with respect to the longitudinal direction of the strip.

2. The soft magnetic metal strip according to claim 1, wherein d/Ra is 10≤d/Ra≤20.

3. The soft magnetic metal strip according to claim 1, wherein the metal strip comprises alloying components of silicon, boron, niobium and copper in more than 73% by atomic weight of iron.

4. The soft magnetic metal strip according to claim 3, wherein the metal strip comprises an alloy having formula $Fe_{75.5}Cu_1Nb_3Si_{12.5}B_8$.

5. The soft magnetic metal strip according to claim 3, wherein the metal strip comprises an alloy with $Fe_{73.5}Cu_1Nb_3Si_{13.5}B_9$.

6. The soft magnetic metal strip according to claim 1, wherein the strip thickness d is 5 μm<d<30 μm.

7. The soft magnetic metal strip according to claim 6, wherein the strip thickness d is 5 μm<d≤20 μm.

8. The soft magnetic metal strip according to claim 6, wherein the roughness Ra is 0.6 μm<Ra<2.5 μm.

9. The soft magnetic metal strip according to claim 8, wherein the roughness Ra is 1 μm<Ra<2 μm.

10. The soft magnetic metal strip according to claim 1, wherein Br/Bm>80%.

11. The soft magnetic metal strip according to claim 1, wherein a surface of the metal strip has a surface topology corresponding to a surface structuring of a casting roller.

12. A magnetic core, comprising a wound soft-magnetic metal strip according to claim 1.

13. An earth leakage circuit breaker having an earth leakage limit value $I_{max}$≤30 mA, and comprising a soft magnetic metal strip according to claim 1.

14. A speed sensor, comprising a soft magnetic metal strip according to claim 1, in co-operation with a segmented permanent magnet disc.

15. An AC-sensitive electromechanical component comprising a soft-magnetic toroidal strip-wound core comprising a soft magnetic metal strip according to claim 1.

16. A alternating current ground fault current interrupter circuit comprising the magnetic core according to claim 12.

17. The alternating current ground fault current interrupter according to claim 16, wherein, at a current frequency of less than 1000 Hz, the magnetic core has a Br/Bm ratio of greater than 80%.

18. A distribution transformer comprising the magnetic core according to claim 12.

19. The distribution transformer according to claim 18, wherein the soft magnetic metal strip is amorphous.

* * * * *